(12) United States Patent
Kawai (10) Patent No.: US 9,904,245 B2
(45) Date of Patent: Feb. 27, 2018

(54) IMAGE FORMING APPARATUS HAVING A CONDENSATION MEMBER PROVIDED IN AN AIRFLOW PATH TO COLLECT AND CONDENSE VAPOR IN AIRFLOW

(71) Applicant: CANON FINETECH INC., Saitama (JP)

(72) Inventor: Shintaro Kawai, Tsukubamirai (JP)

(73) Assignee: Canon Finetech Nisca Inc., Saitama (JP)

(*) Notice: Subject to any disclaimer, the term of this patent is extended or adjusted under 35 U.S.C. 154(b) by 0 days.

(21) Appl. No.: 15/384,515

(22) Filed: Dec. 20, 2016

(65) Prior Publication Data

US 2017/0185035 A1 Jun. 29, 2017

(30) Foreign Application Priority Data

Dec. 28, 2015 (JP) .................................. 2015255613

(51) Int. Cl.
*G03G 21/00* (2006.01)
*G03G 21/20* (2006.01)
*H04N 1/00* (2006.01)

(52) U.S. Cl.
CPC ......... *G03G 21/203* (2013.01); *G03G 21/206* (2013.01); *H04N 1/00992* (2013.01); *G03G 2221/1645* (2013.01)

(58) Field of Classification Search
CPC ........... G03G 15/04036; G03G 21/203; G03G 21/206; G03G 2215/0402; G03G 2215/0404; G03G 2221/1645; B41J 2/442; H04N 1/00909; H04N 1/00992
USPC ...................... 399/92, 97, 118; 347/245, 263
See application file for complete search history.

(56) References Cited

U.S. PATENT DOCUMENTS

| | | | |
|---|---|---|---|
| 4,645,327 A * | 2/1987 | Kimura | G03G 15/751 219/216 |
| 5,241,528 A | 8/1993 | Mohri et al. | |
| 9,014,598 B2 * | 4/2015 | Schlumm | B41F 31/00 399/250 |
| 9,025,991 B2 * | 5/2015 | Namba | G03G 21/1623 399/114 |
| 9,523,959 B2 | 12/2016 | Kawai | |

(Continued)

FOREIGN PATENT DOCUMENTS

| | | | | |
|---|---|---|---|---|
| JP | 57078577 A | * | 5/1982 | ........... G03G 21/206 |
| JP | 60207112 A | * | 10/1985 | ............. G03G 15/04 |

(Continued)

*Primary Examiner* — Robert Beatty
(74) *Attorney, Agent, or Firm* — Fitzpatrick, Cella, Harper & Scinto (57) ABSTRACT

An image forming apparatus 100 includes a photosensitive drum 21 on which an electrostatic latent image is formed by being scanned with a light beam emitted from a light source 29 through a transparent member 26, a developing roller 23 that develops the electrostatic latent image formed on the photosensitive drum 21 to form an image on the photosensitive drum 21, a transfer roller 24 that transfers the image developed and formed by the developing roller 23 to a sheet S, a fixing portion 30 that heat-fixes the image transferred on the sheet S by the transfer roller 24 to the sheet S, and a condensation member 28 provided in an airflow path A from the fixing portion 30 to the transparent member 26, and condenses and collects vapor in the airflow.

7 Claims, 7 Drawing Sheets

(56) References Cited

U.S. PATENT DOCUMENTS

2005/0194525 A1* 9/2005 Saka ................... B41J 2/471
                                              250/234
2007/0059019 A1* 3/2007 Kasama ............ G03G 15/6573
                                               399/91

FOREIGN PATENT DOCUMENTS

| JP | 05182227 | A | | 7/1993 |
|----|----------|---|---|--------|
| JP | 06019003 | A | * | 1/1994 |
| JP | 08044274 | A | * | 2/1996 |
| JP | 2000010439 | A | * | 1/2000 |
| JP | 2002040907 | A | * | 2/2002 |
| JP | 2005338576 | A | | 12/2005 |
| JP | 2009151075 | A | * | 7/2009 |
| JP | 4635476 | B2 | | 2/2011 |

* cited by examiner

IMAGE FORMING APPARATUS HAVING A CONDENSATION MEMBER PROVIDED IN AN AIRFLOW PATH TO COLLECT AND CONDENSE VAPOR IN AIRFLOW

BACKGROUND OF THE INVENTION

Field of the Invention

The present invention relates to an image forming apparatus such as a copying machine, a printer, a facsimile, or a multi-function peripheral incorporating the aforementioned devices, to which an electrophotographic system is applied.

Description of the Related Art

Conventionally, an image forming apparatus to which an electrophotographic system is applied, such as a copying machine, a printer, a facsimile, or a multi-function peripheral incorporating the aforementioned devices, forms an electrostatic latent image on a photoreceptor by irradiating the photoreceptor with a light beam corresponding to image data from a light source, and scanning and exposing the photoreceptor. Further, the image forming apparatus supplies a developer to the electrostatic latent image by a developing unit to make the electrostatic latent image noticeable as an image, and transfers the image from the photoreceptor to a sheet as a recording medium, thereby to form the image on the sheet.

When the temperature around the apparatus main body is sharply raised by an air conditioning facility or the like after the image forming apparatus is left at a low temperature, the temperature of an atmosphere in the apparatus sharply rises from a low temperature to a high temperature. When the sharp temperature rise of the atmosphere in the apparatus is caused, temperatures of components in the apparatus can less easily follow the temperature change of the peripheral environment in a short time. Therefore, condensation may be caused on surfaces of the components.

Further, in a case where sheets having absorbed humidity are passed in large quantities, the humidity in the apparatus sharply rises and the condensation may be caused on the surfaces of the components in the apparatus. In such a case, the condensation caused on an optical component and the like in an optical scanner that emits a light beam from a laser light source causes deterioration of optical characteristics of the light beam that scans and exposes the photoreceptor.

In contrast, Japanese Patent Laid-Open No. 1993-182227 relates to an image forming apparatus that suppresses the condensation on optical components in an optical scanner, and discloses a configuration to house optical components including a semiconductor laser or a reflection mirror in a box-like optical unit, and seals the inside of the optical unit. Accordingly, in the image forming apparatus of Japanese Patent Laid-Open No. 1993-182227, an atmosphere at a raised temperature can be prevented from coming in contact with the optical component at a dew-point temperature or less, and the condensation on the optical components including the semiconductor laser and the like can be prevented.

However, Japanese Patent Laid-Open No. 1993-182227 has a problem that, because the external surface temperature of an optical unit easily becomes the dew-point temperature or less, the condensation is caused on the external surface of a light passing surface of the optical unit, and optical characteristics of the light beam are deteriorated, resulting in a decrease in a required light quantity to a photoreceptor.

Further, Japanese Patent Laid-Open No. 2005-338576 relates to an image forming apparatus, and discloses a configuration to provide a heater unit between a light beam scanning unit and an image forming unit, and heat an atmosphere between the light beam scanning unit and the image forming unit. Further, Japanese Patent Laid-Open No. 2005-338576 discloses a configuration to cause a heated atmosphere to flow from a lowermost portion to an uppermost portion of a plurality of emission windows arrayed in an up and down direction with respect to an installation surface of an apparatus main body, to warm up the plurality of emission windows with the heated atmosphere, thereby to suppress occurrence of the condensation on the plurality of emission windows.

However, in Japanese Patent Laid-Open No. 2005-338576, an increase in manufacturing cost is incurred to newly add a heater unit. Further, to prevent the condensation in an extremely cold region, the heater needs to be ON on a constant basis, and thus there is a problem from the aspects of cost and energy saving.

SUMMARY OF THE INVENTION

An image forming apparatus according to the present invention includes: an image bearing member on which an electrostatic latent image is formed by being scanned with a light beam emitted from a light source through a transparent member; a developing portion which develops the electrostatic latent image formed on the image bearing member with a developer to form an image on the image bearing member; a transfer portion which transfers the image developed and formed by the developing portion to a recording medium; a fixing portion which heat-fixes the image transferred to the recording medium by the transfer portion to the recording medium; and a condensation member provided in an airflow path from the fixing portion to the transparent member, and which condenses and collects vapor in the airflow.

Further features of the present invention will become apparent from the following description of exemplary embodiments with reference to the attached drawings.

DESCRIPTION OF THE EMBODIMENTS

Hereinafter, an embodiment of the present invention will be described in detail with reference to the drawings.

<Configuration of Image Forming Apparatus>

Figure 1:
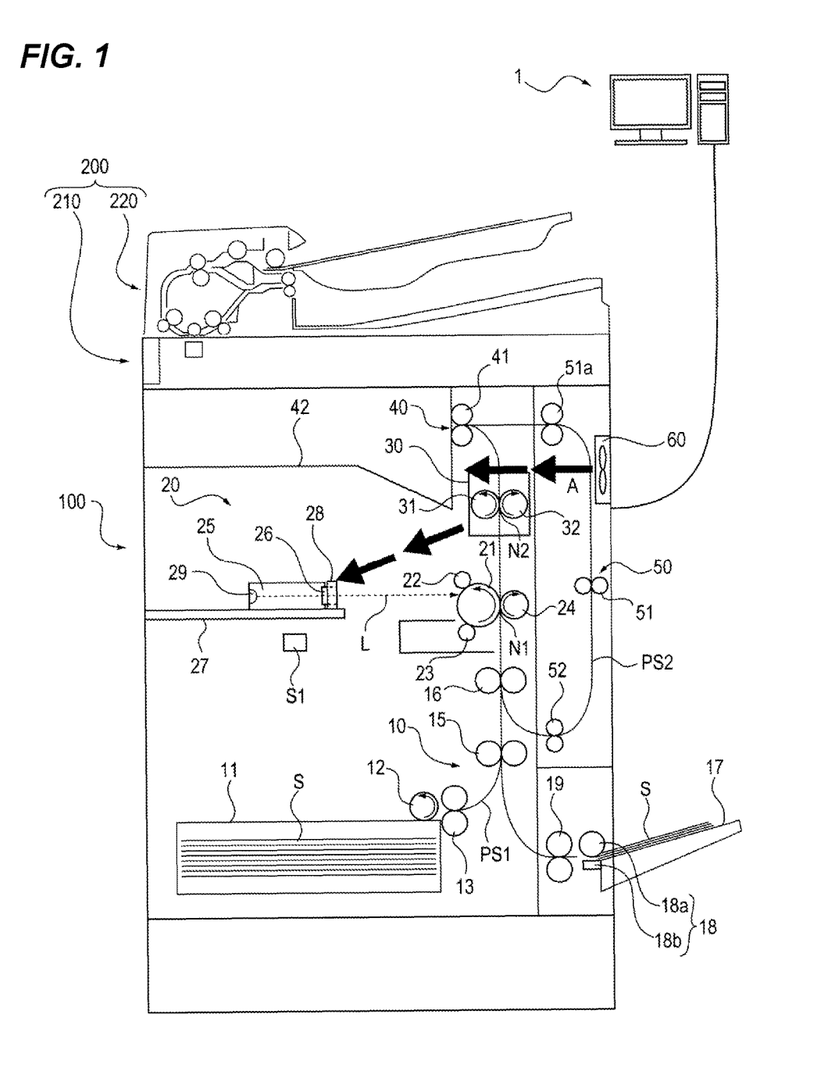
FIG. 1 is a sectional view of an image forming apparatus according to an embodiment of the present invention.
Figure 2:
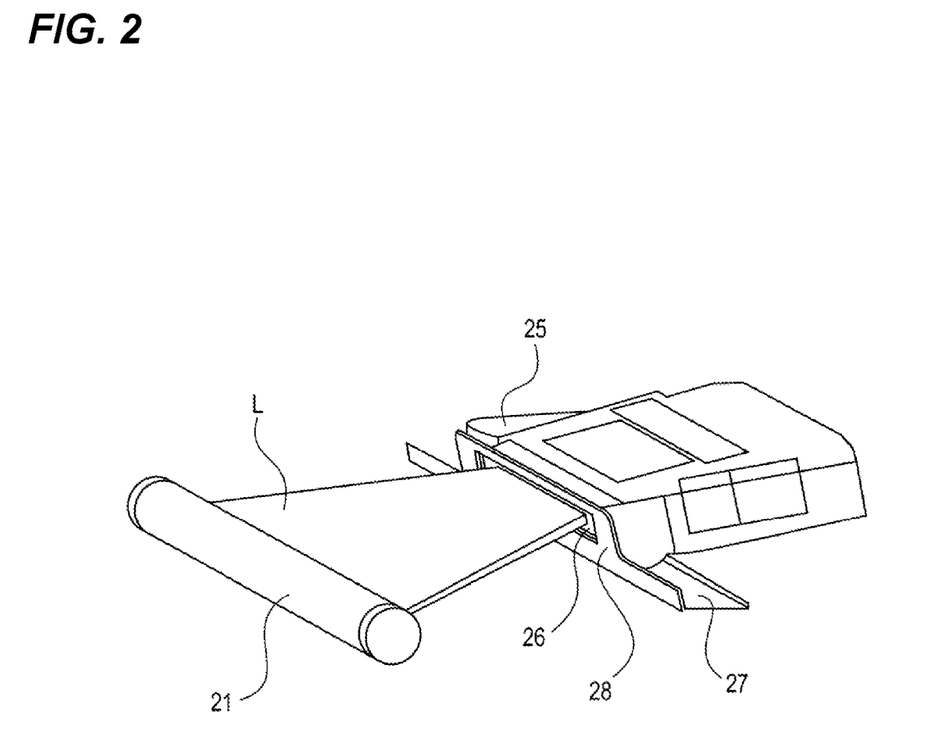
FIG. 2 is a perspective view of a laser scanner and its periphery according to an embodiment of the present invention.

A configuration of an image forming apparatus 100 according to an embodiment of the present invention will be described in detail with reference to FIG. 1. The image forming apparatus 100 is provided with an image reading apparatus 200 that reads an image of an original. The image reading apparatus 200 includes an image reading portion 210 that reads the image of the original, and an original feed portion 220 that feeds the original to the image reading portion 210.

The image forming apparatus 100 includes a sheet feed portion 10, an image forming portion 20, a fixing portion 30, a sheet discharge portion 40, a sheet re-feed portion 50, a fan 60, and an environmental sensor S1.

The sheet feed portion 10 supplies a sheet S as a recording medium loaded in a sheet cassette 11 or a multi sheet tray 17 to the image forming portion 20. To be specific, the sheet feed portion 10 includes a sheet cassette 11, a pickup roller 12, a separation roller 13, a feed roller 15, a registration roller 16, a multi sheet tray 17, a supply roller 18, and a supply roller 19.

In the sheet cassette 11, the sheet S is loaded and housed.

The pickup roller 12 rotates to supply the sheet S housed in the sheet cassette 11 to the separation roller 13.

The separation roller 13 includes a forward rotating roller and a reverse rotating roller. In a case where the sheets S are double-fed, the separation roller 13 separates the double-fed sheets S to one sheet, and supplies the sheet S to a feed path PS1.

The feed roller 15 supplies the sheet S supplied from the feed path PS1 to the registration roller 16.

The registration roller 16 rotates at predetermined timing. The registration roller 16 corrects skew feeding of the sheet S by causing a tip end of the sheet S supplied from the feed roller 15 or a feed roller 52 to follow a nip when stopping the rotation. The registration roller 16 supplies the sheet S with corrected skew feeding to a photosensitive drum 21 when the registration roller 16 rotates.

In the multi sheet tray 17, the sheets S are loaded.

The supply roller 18 includes a roller 18a and a separation pad 18b, and separates the sheets S loaded in the multi sheet tray 17 to one sheet and supplies the sheet S to the supply roller 19.

The supply roller 19 supplies the sheet S supplied from the supply roller 18 to the feed roller 15.

The image forming portion 20 forms an electrostatic latent image on the photosensitive drum 21, and develops the electrostatic latent image on the photosensitive drum 21 by developer. To be specific, the image forming portion 20 includes the photosensitive drum 21, a charging roller 22, a developing roller 23, a transfer roller 24, a laser unit housing 25, a transparent member 26, a scanner stay 27, a condensation member 28, and a light source 29.

A surface of the photosensitive drum 21 as an image bearing member is uniformly charged by the charging roller 22. The photosensitive drum 21 is irradiated with laser light L as a light beam from the light source 29, so that a charge on a portion irradiated with the laser light L is removed and the electrostatic latent image is formed.

The charging roller 22 is applied a charging bias voltage from a charging bias power source (not illustrated), and charges the photosensitive drum 21.

The developing roller 23 as a developing portion causes a developer to adhere to the photosensitive drum 21, thereby to develop the electrostatic latent image formed on the photosensitive drum 21 and form an image (developer image) on the photosensitive drum 21.

The transfer roller 24 as a transfer portion forms a transfer nip portion N1 with the photosensitive drum 21, applies a bias voltage to the sheet S supplied from the registration roller 16 to the transfer nip portion N1, and transfers the developer image formed on the photosensitive drum 21 to the sheet S. The transfer roller 24 nips the sheet S with the photosensitive drum 21 in the transfer nip portion N1, and supplies the sheet S on which the developer image has been transferred to the fixing portion 30.

The laser unit housing 25 houses the light source 29, and is provided with the transparent member 26. The laser unit housing 25, the light source 29, and the transparent member 26 configure a light beam scanning unit.

Figure 3:
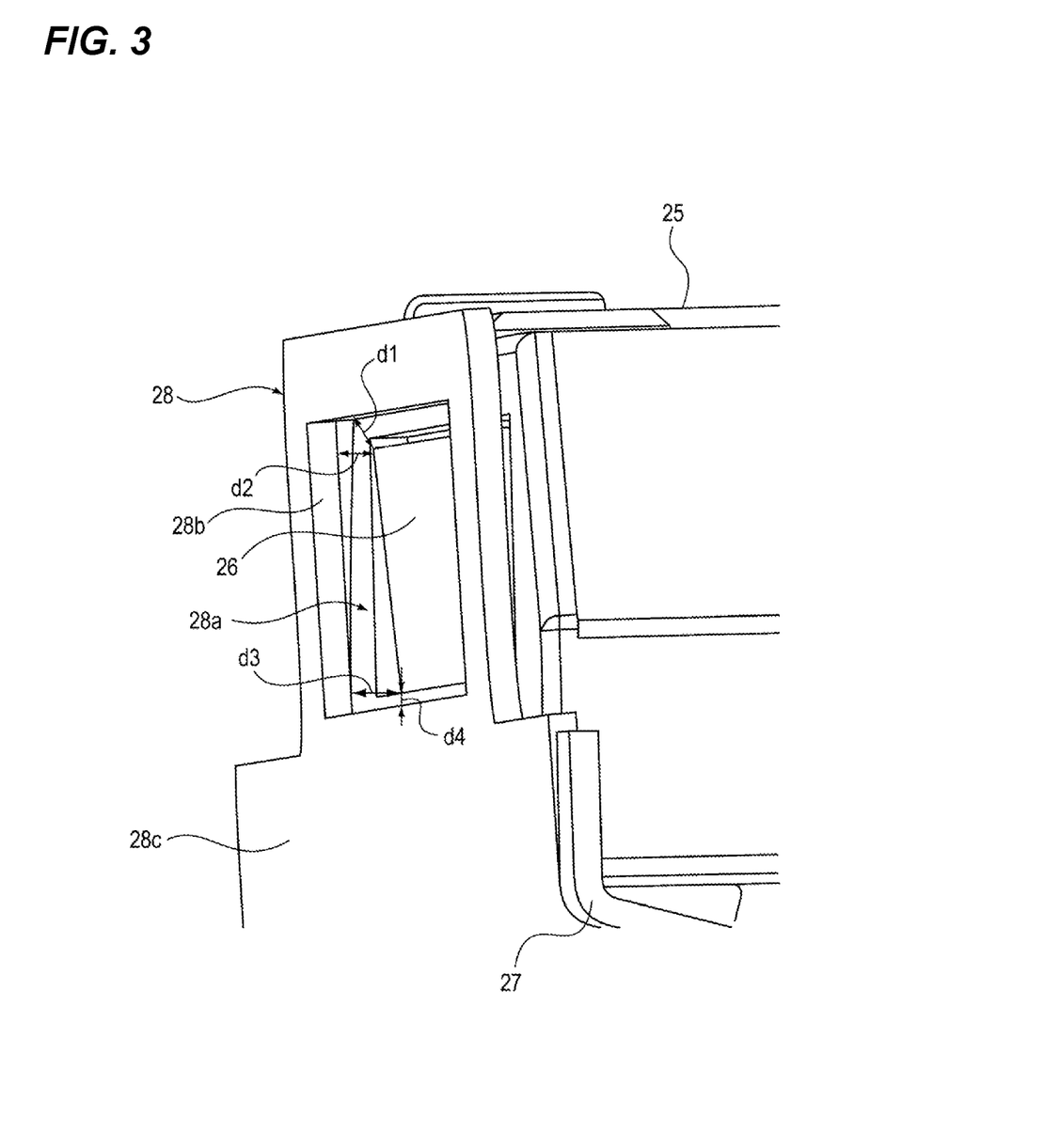
FIG. 3 is an enlarged perspective view of principal portions of an image forming apparatus according to an embodiment of the present invention.

The transparent member 26 has a square shape and is transparent, and transmits the laser light L emitted from the light source 29 to an outside. The transparent member 26 is provided to prevent dust inside the laser unit housing 25. The transparent member 26 is provided downstream of the fixing portion 30 in an airflow path A illustrated by the arrows in FIG. 1, of the air sent from the fan 60. A portion of the transparent member 26, the portion coming in contact with the airflow in the airflow path A up to when the air sent from the fan 60 reaches the laser unit housing 25, is formed in a mold (plastic). As illustrated in FIG. 3, the transparent member 26 is installed to be inclined with respect to the laser light L by a predetermined angle for prevention of reflection. Here, the predetermined angle is 5°, for example.

The scanner stay 27 is a metal member having a larger heat capacity than the condensation member 28, and on which the laser unit housing 25 is placed and with which the condensation member 28 is connected and is in contact.

The condensation member 28 is formed of metal having higher thermal conductivity than the transparent member 26. Here, the metal that forms the condensation member 28 is iron, for example.

As illustrated in FIG. 3, the condensation member 28 includes a window hole 28a, a window frame portion 28b, and a connection portion 28c.

The window hole 28a has a square shape, and faces the transparent member 26 and transmits the laser light L emitted from the light source 29 through the transparent member 26.

The window frame portion 28b is provided in a position where the window frame portion 28b does not interfere with the laser light L emitted from the light source 29 through the transparent member 26, and is provided in a periphery of the transparent member 26.

The connection portion 28c is provided below the window frame portion 28b, and is connected and in contact with the scanner stay 27.

The condensation member 28 is provided in the airflow path from the fixing portion 30 to the transparent member 26. The condensation member 28 is positioned upstream of the transparent member 26 with respect to the airflow. The condensation member 28 condenses and collects vapor in the airflow in the image forming apparatus 100.

The light source 29 emits the laser light L according to image data of an image read in the image reading apparatus 200, or image data transmitted from a host PC 1, and irradiates the photosensitive drum 21 with the emitted laser light L through the transparent member 26.

The fixing portion 30 heat-fixes the developer image formed on the sheet S supplied from the image forming portion 20 to the sheet S, and supplies the sheet S on which the developer image has been heat-fixed to the sheet discharge portion 40. The fixing portion 30 includes a fixing roller 31 as a heating member, a pressure roller 32 as a pressure member, and a ceramic heater 33.

The fixing roller 31 is made of material such as aluminum, and is heated to a predetermined temperature by a heat source such as a halogen lamp. The fixing roller 31 heats the sheet S on which a toner image having not yet been heat-fixed and supplied from the transfer nip portion N1 is formed.

The pressure roller 32 is installed to be in contact with the fixing roller 31, and pressurizes the fixing roller 31 with a predetermined pressure, and forms a fixing nip portion N2 with the fixing roller 31. The pressure roller 32 presses the sheet S on which the developer image has been transferred and supplied from the transfer roller 24 against the fixing roller 31, and heats and pressurizes the sheet S in the fixing nip portion N2, thereby to heat-fix the developer image on the sheet S. The pressure roller 32 nips the sheet S with the fixing roller 31 in the fixing nip portion N2, and supplies the sheet S on which the developer image has been heat-fixed to a discharge roller 41.

Note that, as the fixing portion 30, an on-demand fixing system to form the fixing nip portion N2 by pressurizing the sheet S with the pressure roller 32 through a film in place of the fixing roller 31 with respect to the heat source such as a ceramic heater, and to heat and pressurize the sheet in the fixing nip portion N2 may be used.

The sheet discharge portion 40 discharges the sheet S supplied from the fixing portion 30 to an outside. To be specific, the sheet discharge portion 40 includes a discharge roller 41 and a discharge tray 42.

The discharge roller 41 discharges the sheet S supplied from the fixing nip portion N2 to the discharge tray 42. In a case where images are formed on both surfaces of the sheet S, the discharge roller 41 stops once before a rear end of the sheet S with an image formed on one surface passes through, and then reversely rotates and inverts the sheet S, and supplies the sheet S to the sheet re-feed portion 50.

On the discharge tray 42, the sheet S discharged from the discharge roller 41 is placed.

The sheet re-feed portion 50 supplies the sheet S supplied from the sheet discharge portion 40 to the sheet feed portion 10. To be specific, the sheet re-feed portion 50 includes the feed roller 51 and the feed roller 52.

The feed roller 51 supplies the sheet S conveyed from the discharge roller 41 to a re-feed path PS2.

The feed roller 52 conveys the sheet S supplied from the re-feed path PS2 to the registration roller 16.

The fan 60 takes in the air from outside of the image forming apparatus 100, and sends the taken air to the fixing portion 30 and the sheet S at a fixed flow rate to generate the airflow inside the image forming apparatus 100, and cools both the sheet S, heated and pressurized in the fixing portion 30, and the fixing portion 30.

The environmental sensor S1 detects a temperature and a humidity in the image forming apparatus 100, and outputs the detected temperature and humidity as electrical signals. Here, as the environmental sensor S1, a composite sensor in which a thermistor that detects the temperature and a capacitive sensor that detects the humidity are combined is exemplified.

<Configuration of Controller of Image Forming Apparatus>

A configuration of the controller 70 of the image forming apparatus 100 according to an embodiment of the present invention will be described in detail with reference to FIGS. 4 and 5.

Figure 4:
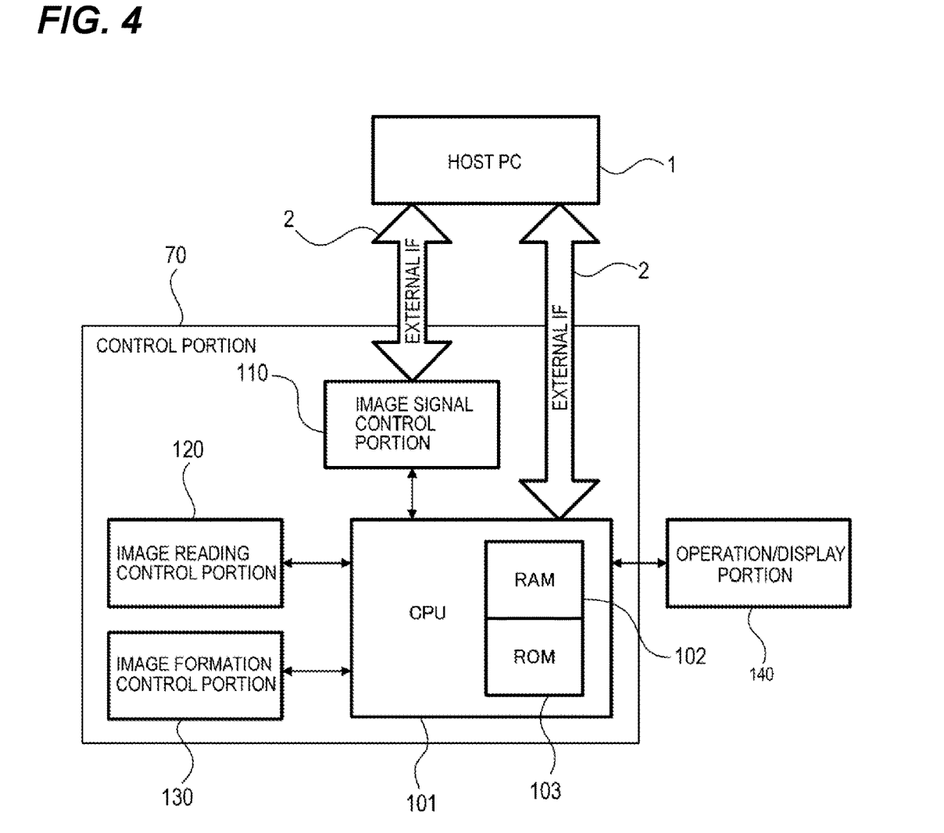
FIG. 4 is a block diagram illustrating a configuration of a controller of an image forming apparatus according to an embodiment of the present invention.

As illustrated in FIG. 4, the controller 70 includes a CPU 101, an image signal controller 110, an image reading controller 120, and an image formation controller 130. Note that an operation/display portion 140 displays information such as a message to a user by control of the CPU 101, and detects an input by an operation of the user, such as setting to the image forming apparatus 100 and outputs an electrical signal according to a detection result to the CPU 101.

The CPU 101 includes a RAM 102 used as a storage area of input data or a work storage area, and a ROM 103 in which programs of a control procedure and the like are stored.

The CPU 101 outputs a control signal that causes the image formation controller 130 to execute image forming processing on the basis of image data input from the image signal controller 110 to the image formation controller 130. The CPU 101 outputs a control signal that causes the image formation controller 130 to execute image forming processing on the basis of image data input from the image reading controller 120 to the image formation controller 130. The CPU 101 outputs the image data input from the image reading controller 120 to the image signal controller 110, and outputs information such as an apparatus status to the image signal controller 110.

The CPU 101 controls operations of the image signal controller 110, the image reading controller 120, and the image formation controller 130 on the basis of the electrical signal input from the operation/display portion 140. The CPU 101 performs control for displaying information on the operation/display portion 140.

The image signal controller 110 is connected with the host PC 1 through an external interface 2. The image signal controller 110 receives a signal transmitted from the host PC 1 through the external interface 2, and acquires the image data by executing reception processing. The image signal controller 110 outputs the received image data to the CPU 101.

The image reading controller 120 performs control of a reading operation of the original and a conveying operation of the original in the image reading apparatus 200. The image reading controller 120 outputs the image read in the reading operation of the original in the image reading apparatus 200 to the CPU 101 as image data.

The image formation controller 130 executes image forming processing of forming an image on the sheet S on the basis of the control signal input from the CPU 101.

Figure 5:
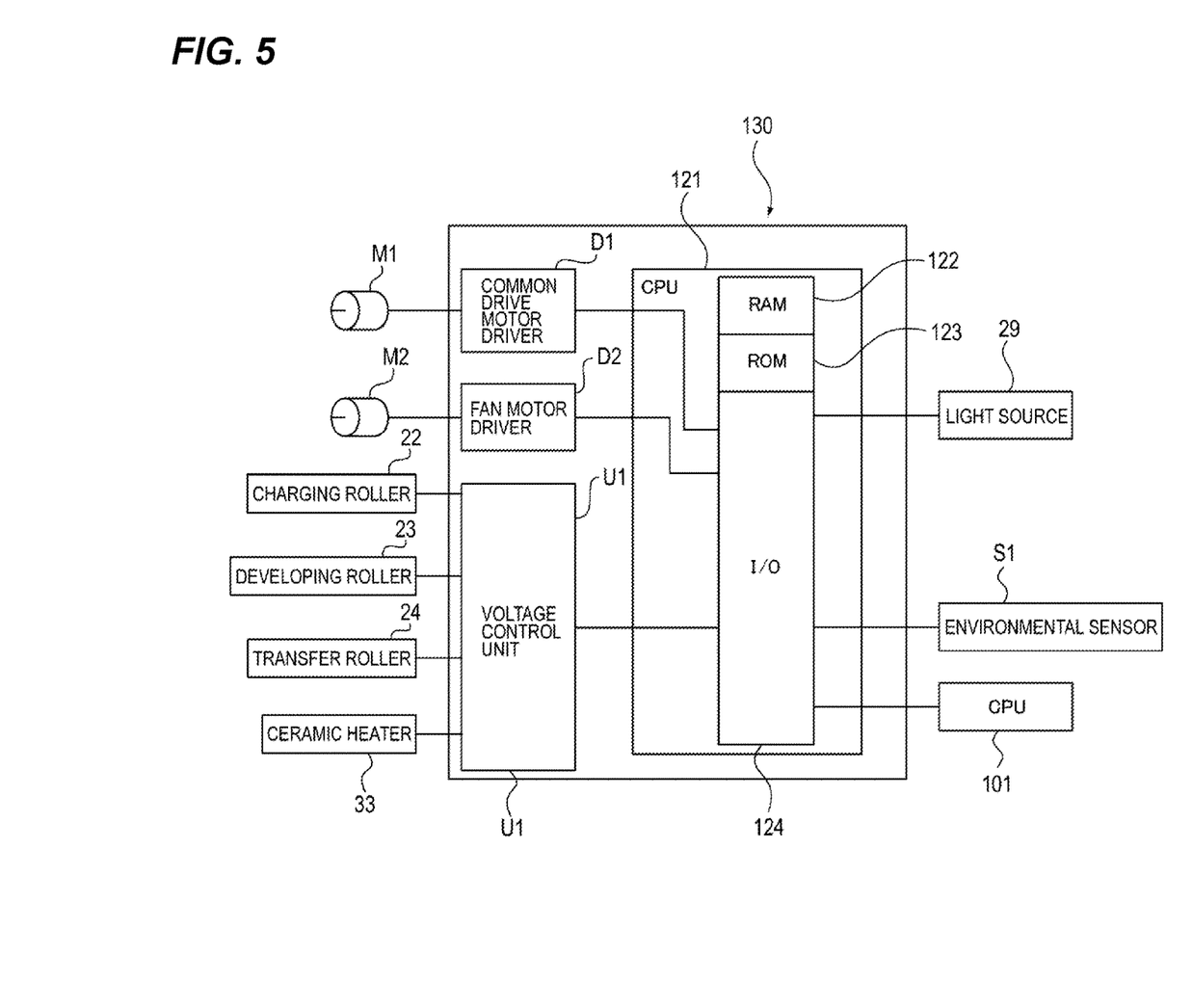
FIG. 5 is a block diagram illustrating a configuration of an image formation controller according to an embodiment of the present invention.

As illustrated in FIG. 5, the image formation controller 130 includes a CPU 121, a common drive motor driver D1, a fan motor driver D2, and a voltage control unit U1.

The CPU 101, the voltage control unit U1, the light source 29, the common drive motor driver D1, and the fan motor driver D2 are connected to the CPU 121 through an I/O port 124. The CPU 121 controls operations of the voltage control unit U1, the light source 29, the common drive motor driver D1, and the fan motor driver D2 on the basis of the control signal input from the CPU 101.

The CPU 121 includes a RAM 122 used as a storage area of input data or a work storage area, and a ROM 123 in which programs of a control procedure and the like are stored. The CPU 121 controls operations of the common drive motor driver D1, the voltage control unit U1, and the fan motor driver D2 on the basis of the temperature or the humidity indicated by the electrical signal input from the environmental sensor S1.

The common drive motor driver D1 drives a common drive motor M1 according to the control of the CPU 121, thereby to rotate the photosensitive drum 21, and the developing roller 23 or the transfer roller 24.

The fan motor driver D2 drives a fan motor M2 according to the control of the CPU 121, thereby to operate the fixing portion 30 and the fan 60.

The voltage control unit U1 applies a voltage to the charging roller 22, the developing roller 23, the transfer roller 24, or the ceramic heater 33 as a heat source, according to the control of the CPU 121.

<Positional Relationship Between Transparent Member and Condensation Member>

A positional relationship between the transparent member 26 and the condensation member 28 according to an embodiment of the present invention will be described in detail with reference to FIGS. 3 to 6.

An interval between the transparent member 26 and the condensation member 28 is set on the basis of the degree of condensation on the transparent member 26.

To be specific, in a case where shortest distances between upper and lower two corners in a depth side in FIG. 3, of the square transparent member 26, and upper, lower, right, and left inner edge portions that surround the window hole 28a, of the window frame portion 28b of the condensation member 28, are d1, d2, d3, and d4, respectively, the shortest distance d3 is made largest. Note that shortest distances between upper and lower two corners in a front side in FIG. 3, of the transparent member 26, and the upper, lower, right, and left inner edge portions that surround the window hole 28a, of the window frame portion 28b, are the same as the shortest distances d1, d2, d3, and d4.

Figure 6:
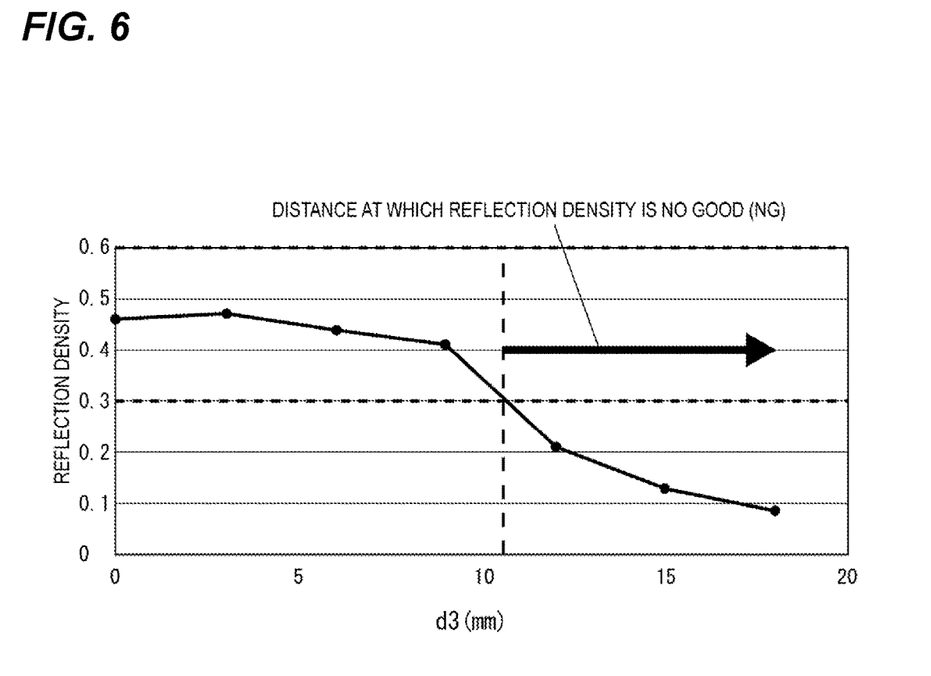
FIG. 6 is a diagram illustrating a relationship between a shortest distance d3 and reflection density when the shortest distance d3 is changed according to an embodiment of the present invention.

FIG. 6 illustrates a relationship between the largest shortest distance d3 and reflection density of an output image under a condition in which the condensation easily occurs.

As illustrated in FIG. 6, in a case where the shortest distance d3 is 9 mm or less with respect to a target value 0.45 of the reflection density, a phenomenon that the density of the output image is decreased due to the condensation is not caused. Meanwhile, in a case where the shortest distance d3 exceeds 9 mm, the decrease in the density of the output image due to the condensation is caused. Further, in a case where the shortest distance d3 exceeds 10 mm and the reflection density falls below 0.3, the decrease in the density of the output image due to the condensation becomes significant, and the image is deteriorated to a state where the image failure can be determined by human eyes. As described above, when the condensation is caused on the transparent member 26, the reflection density of the output image is decreased, and especially, the reflection density in a half tone output image is significantly affected.

Accordingly, by setting the shortest distance d3 to 9 mm or less, the condensation on the transparent member 26 can be prevented, and the decrease in the density of the output image due to the condensation can be prevented. Even if the transparent member 26 is perpendicular to (not inclined to) the laser light L, the decrease in the density of the output image due to the condensation can be prevented under an environment in which the condensation easily occurs, by setting the shortest distance d3 to 9 mm or less. Therefore, to provide the condensation member 28 near the transparent member 26, it is favorable to provide the condensation member 28 such that the largest shortest distance, of the shortest distances from the corners of the transparent member 26 to the upper, lower, right, and left inner edge portions that surround the window hole 28a, of the window frame portion 28b, becomes 9 mm or less.

<Operation of Image Forming Apparatus>

Figure 7:
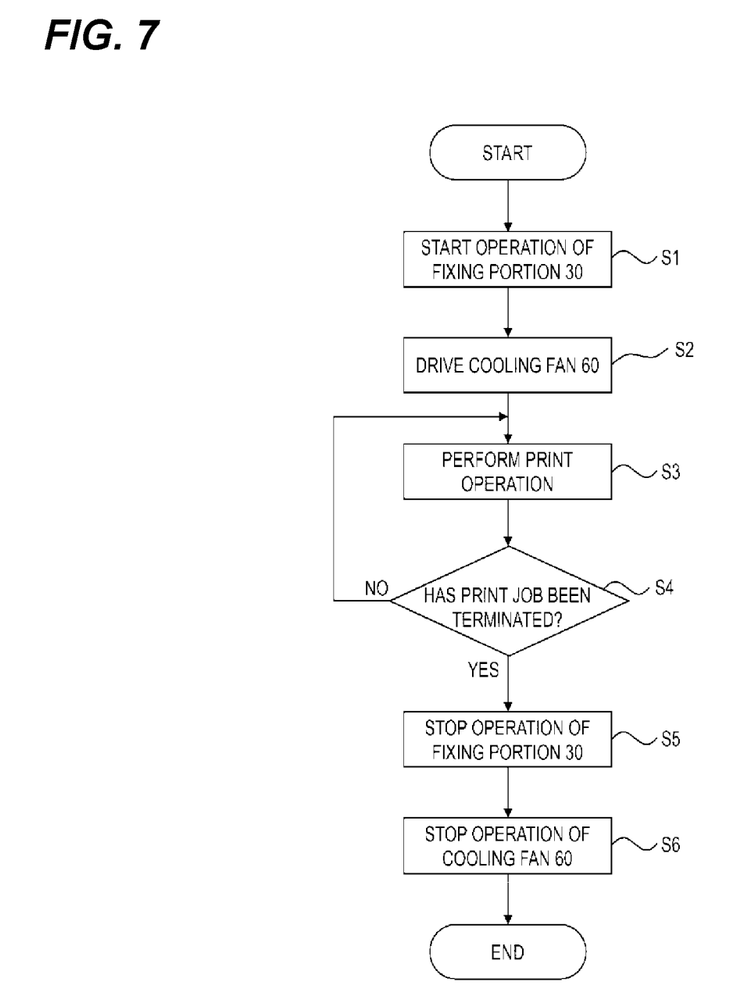
FIG. 7 is a flowchart illustrating an operation of an image forming apparatus according to an embodiment of the present invention.

An operation of an image forming apparatus according to an embodiment of the present invention will be described in detail with reference to FIG. 7.

The image forming apparatus 100 receives a print job as a print command transmitted from the host PC 1, and executes the received print job as the CPU 121 executes the program stored in the ROM 123.

First, the CPU 121 rotates the common drive motor M1 through the common drive motor driver D1, and applies the voltage to the ceramic heater 33 to perform heating through the voltage control unit U1, to start the operation of the fixing portion 30 (step S1).

Next, the CPU 121 controls the fan motor M2 through the fan motor driver D2 to drive the fan 60 (step S2).

Next, the CPU 121 performs a print operation to form an image on the sheet S (step S3).

Next, the CPU 121 determines whether the print job has been terminated (step S4).

When the print job has been terminated (Yes in step S4), the CPU 121 stops the operation of the fixing portion 30 (step S5) and stops the operation of the fan 60 (step S6), and terminates cooling processing.

Meanwhile, when the print job has not yet been terminated (No in step S4), the CPU 121 returns the processing to step S3.

In the above operation, the air containing the vapor in the periphery of the transparent member 26 comes in contact with the condensation member 28 before coming into contact with the transparent member 26. Accordingly, the vapor in the air in the periphery of the transparent member 26 is condensed on the condensation member 28. Therefore, the vapor amount in the air in the periphery of the transparent member 26 can be decreased. Here, the condensation member 28 is formed of metal having higher thermal conductivity than the transparent member 26. Therefore, the temperature of the condensation member 28 becomes lower than a dew-point temperature before the temperature of the transparent member 26 does, and the condensation member 28 diffuses the heat all around even if a hot blast locally blows against the condensation member 28, and the condensation member 28 can keep the cooled state.

Further, the condensation member 28 is installed on the scanner stay 27 made of metal and having a larger heat capacity than the condensation member 28, and is in contact with the scanner stay 27. Accordingly, even if the temperature in the image forming apparatus 100 rises, rise of the temperature of the condensation member 28 can be suppressed, and the vapor in the air can be easily condensed on the condensation member 28.

Further, in a case where the sheet S is heated by the fixing portion 30, the moisture contained in the sheet S is released into the air as vapor, and the humidity in the periphery of the fixing portion 30 rises. At this time, as illustrated in FIG. 1, when the air having high humidity reaches the transparent member 26 due to the airflow from the fan 60, the condensation is caused on the transparent member 26. In the present embodiment, the air having high humidity comes in contact with the condensation member 28 before reaching the transparent member 26, and thus the vapor in the air having high humidity is condensed on the condensation member 28. Therefore, the air with a reduced vapor amount reaches the transparent member 26 positioned downstream of the condensation member 28, and thus the dew point can be kept low and the condensation on the transparent member 26 can be prevented.

Further, the window frame portion 28b of the condensation member 28 is provided in a periphery of the transparent member 26, whereby the vapor in the air flowing into the transparent member 26 from above and below, and the right and left can be condensed on the condensation member 28.

As described above, according to the present embodiment, the condensation member 28, which condenses and collects the vapor in the airflow, is provided in the airflow path A from the fixing portion 30 to the transparent member 26, whereby the image forming apparatus that can prevent condensation on the member that transmits the light beam can be provided.

Note that, in the present embodiment, the condensation member 28 is brought in contact with the scanner stay 27. However, the condensation member 28 may be brought in contact with a metal member other than the scanner stay 27, the metal member having a larger heat capacity than the condensation member 28.

Further, in the present embodiment, the condensation member 28 includes the window hole 28a, the window frame portion 28b, and the connection portion 28c. However, the condensation member can be formed into an arbitrary shape as long as the condensation member does not interfere with the laser light L.

Further, in the present embodiment, a part of the condensation member 28 may just be positioned upstream of the transparent member 26 with respect to the airflow.

Further, in the present embodiment, the airflow path A is formed by the fan 60. However, the airflow path may be formed by a device other than the fan 60.

Note that, in the present embodiment, the image forming apparatus in the system that directly transfers the developer image formed on the photosensitive drum 21 to the sheet S has been described. However, the present invention can be applied to an image forming apparatus in a system that transfers a developer image formed on a photosensitive drum to an intermediate transfer belt (ITB), and further transfers the image from the intermediate transfer belt to a sheet.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2015-255613, filed Dec. 28, 2015, which is hereby incorporated by reference herein in its entirety.

What is claimed is:

1. An image forming apparatus comprising:
an image bearing member on which an electrostatic latent image is formed with a light beam emitted from a light source through a transparent member;
a developing portion which develops the electrostatic latent image formed on the image bearing member with a developer to form an image on the image bearing member;
a transfer portion which transfers the image developed by the developing portion to a recording medium;
a fixing portion which heat-fixes the image transferred to the recording medium by the transfer portion to the recording medium; and
a condensation member provided in an airflow path from the fixing portion to the transparent member, wherein the condensation member is provided so as to surround an area through which the light beam passes, and the condensation member collects and condenses vapor in airflow in the airflow path.

2. The image forming apparatus according to claim 1, wherein the condensation member is connected to a member having a larger heat capacity than the condensation member.

3. The image forming apparatus according to claim 1, wherein an interval between the transparent member and the condensation member is set on the basis of a degree of condensation on the transparent member.

4. The image forming apparatus according to claim 1, wherein a portion of the transparent member that comes into contact with the airflow in the airflow path is formed in a mold.

5. An image forming apparatus comprising:
an image bearing member on which an electrostatic latent image is formed with a light beam emitted from a light source through a transparent member;
a developing portion which develops the electrostatic latent image formed on the image bearing member with a developer to form an image on the image bearing member;
a transfer portion which transfers the image developed by the developing portion to a recording medium;
a fixing portion which heat-fixes the image transferred to the recording medium by the transfer portion to the recording medium;
a fan configured to generate an airflow from the fixing portion to the transparent member; and
a condensation member configured to collect and condense vapor in the airflow, wherein at least a part of the condensation member is positioned upstream of the transparent member with respect to a direction of the airflow.

6. An image forming apparatus comprising:
an image bearing member on which an electrostatic latent image is formed with a light beam emitted from a light source through a transparent member;
a developing portion which develops the electrostatic latent image formed on the image bearing member with a developer to form an image on the image bearing member;
a transfer portion which transfers the image developed by the developing portion to a recording medium;
a fixing portion which heat-fixes the image transferred to the recording medium by the transfer portion to the recording medium; and
a metal member provided in an airflow path from the fixing portion to the transparent member, wherein the metal member is provided so as to surround an area though which the light beam passes.

7. An image forming apparatus comprising:
an image bearing member on which an electrostatic latent image is formed with a light beam emitted from a light source through a transparent member;
a developing portion which develops the electrostatic latent image formed on the image bearing member with a developer to form an image on the image bearing member;
a transfer portion which transfers the image developed by the developing portion to a recording medium;
a fixing portion which heat-fixes the image transferred to the recording medium by the transfer portion to the recording medium;
a fan configured to generate an airflow from the fixing portion to the transparent member; and a metal member, wherein at least a part of the metal member is positioned upstream of the transparent member with respect to the airflow.

\* \* \* \* \*